United States Patent [19]

Hanagan

[11] Patent Number: 5,608,957
[45] Date of Patent: Mar. 11, 1997

[54] METHOD OF MAKING A MOTORCYCLE SEAT

[76] Inventor: Michael W. Hanagan, 25980 Paseo Estribo, Monterey, Calif. 93940

[21] Appl. No.: 652,811

[22] Filed: May 23, 1996

Related U.S. Application Data

[62] Division of Ser. No. 377,650, Jan. 25, 1995, Pat. No. 5,544,937.

[51] Int. Cl.⁶ .................... B29C 44/06; B29C 44/12
[52] U.S. Cl. .................... 29/91.1; 29/527.1; 264/46.4; 264/46.6; 264/46.7; 264/161; 264/258; 264/271.1
[58] Field of Search .................. 264/45.3, 46.4, 264/46.6, 46.7, 258, 161, 271.1; 29/91.1, 527.1

[56] References Cited

U.S. PATENT DOCUMENTS

| | | | |
|---|---|---|---|
| 4,030,750 | 6/1977 | Abram . | |
| 4,298,556 | 11/1981 | Rutsch et al. | 264/46.7 |
| 4,372,900 | 2/1983 | Doerfling | 264/45.3 |
| 4,446,185 | 5/1984 | Waragai et al. | 264/45.3 |
| 4,466,660 | 8/1984 | Mabie . | |
| 4,952,358 | 8/1990 | Okina et al. | 264/45.3 |
| 4,953,911 | 9/1990 | Hanagan . | |
| 5,017,115 | 5/1991 | Yanagishita et al. | 264/46.7 |
| 5,026,119 | 6/1991 | Frank et al. . | |
| 5,043,114 | 8/1991 | Saito et al. | 264/46.7 |
| 5,173,227 | 12/1992 | Ewen et al. | 264/258 |
| 5,176,860 | 1/1993 | Storch | 264/46.7 |
| 5,196,151 | 3/1993 | Sakaida et al. | 264/46.7 |
| 5,543,094 | 8/1996 | Hara et al. | 264/258 |

Primary Examiner—Allan R. Kuhns
Attorney, Agent, or Firm—Pepe & Hazard

[57] ABSTRACT

A tandem motorcycle seat for attachment to the frame of an associated motorcycle has a unitary, rigid, elongated platform member configured to seat upon and be secured to the frame of the motorcycle, and an elongated tandem saddle on the platform member providing drive and passenger seat portions. A backrest for a person seated on one of the seat portions has a depending leg spaced inwardly from the side margins of the saddle which extends through a passage in the saddle into a receptacle on a bracket secured to the platform member. In making the seat, a first layer of a mixture of glass fibers and polyester resin is embedded on the lower element of a mold which is configured to form the platform member of the seat. Hardware is applied on the first layer and a second layer of glass fiber/resin is applied to the first layer and about the hardware so as to encapsulate at least a portion of the hardware in the layers which are then partially cured. A foamable synthetic resin is introduced into the lower element of the mold onto the partially cured second layer. The first and second layers and the foamable synthetic resin are concurrently cured to produce a chemical bond between the glass reinforced layers and foam layer and the composite seat body is removed from the mold and covered with a pliable outer layer of material.

5 Claims, 6 Drawing Sheets

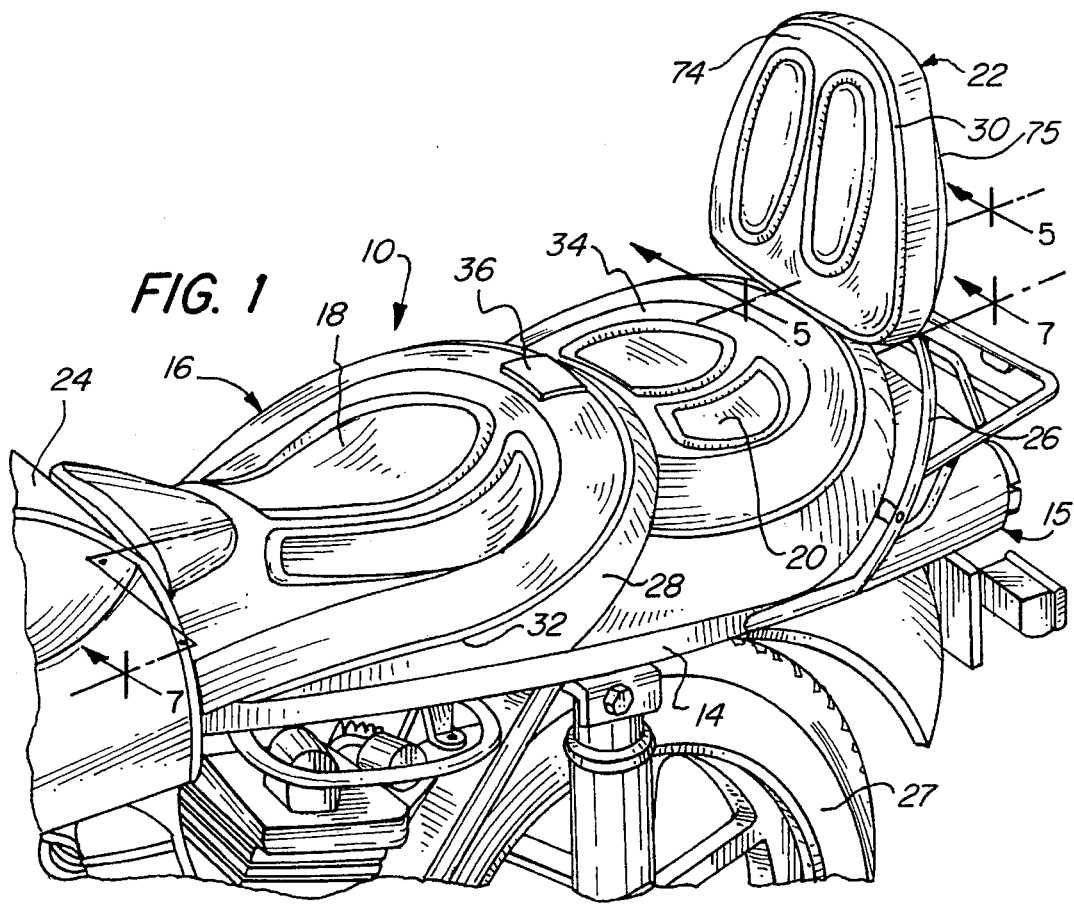
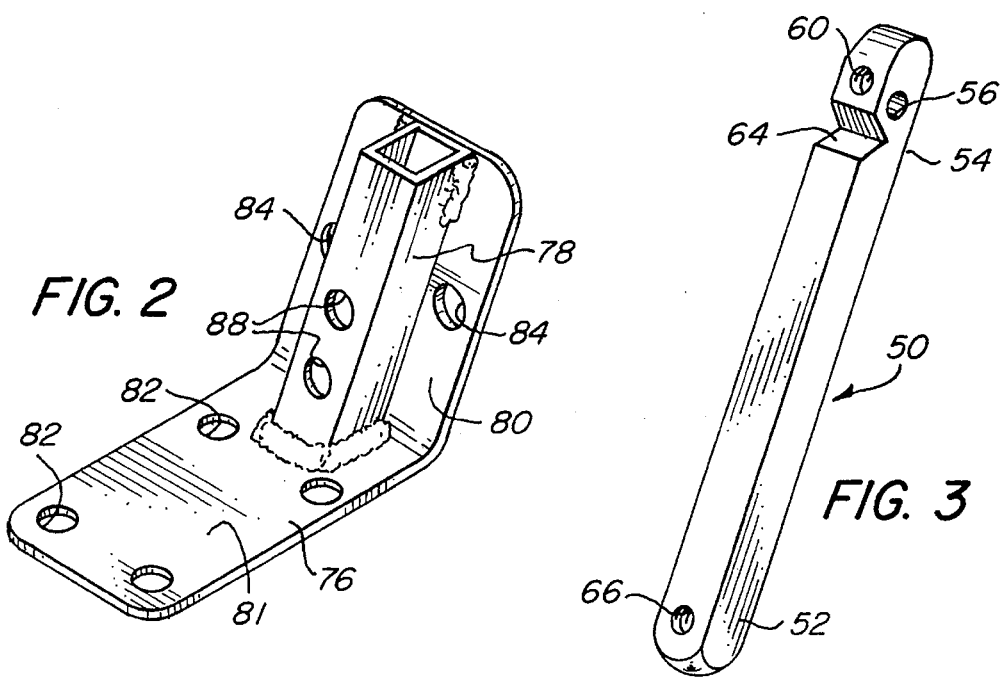

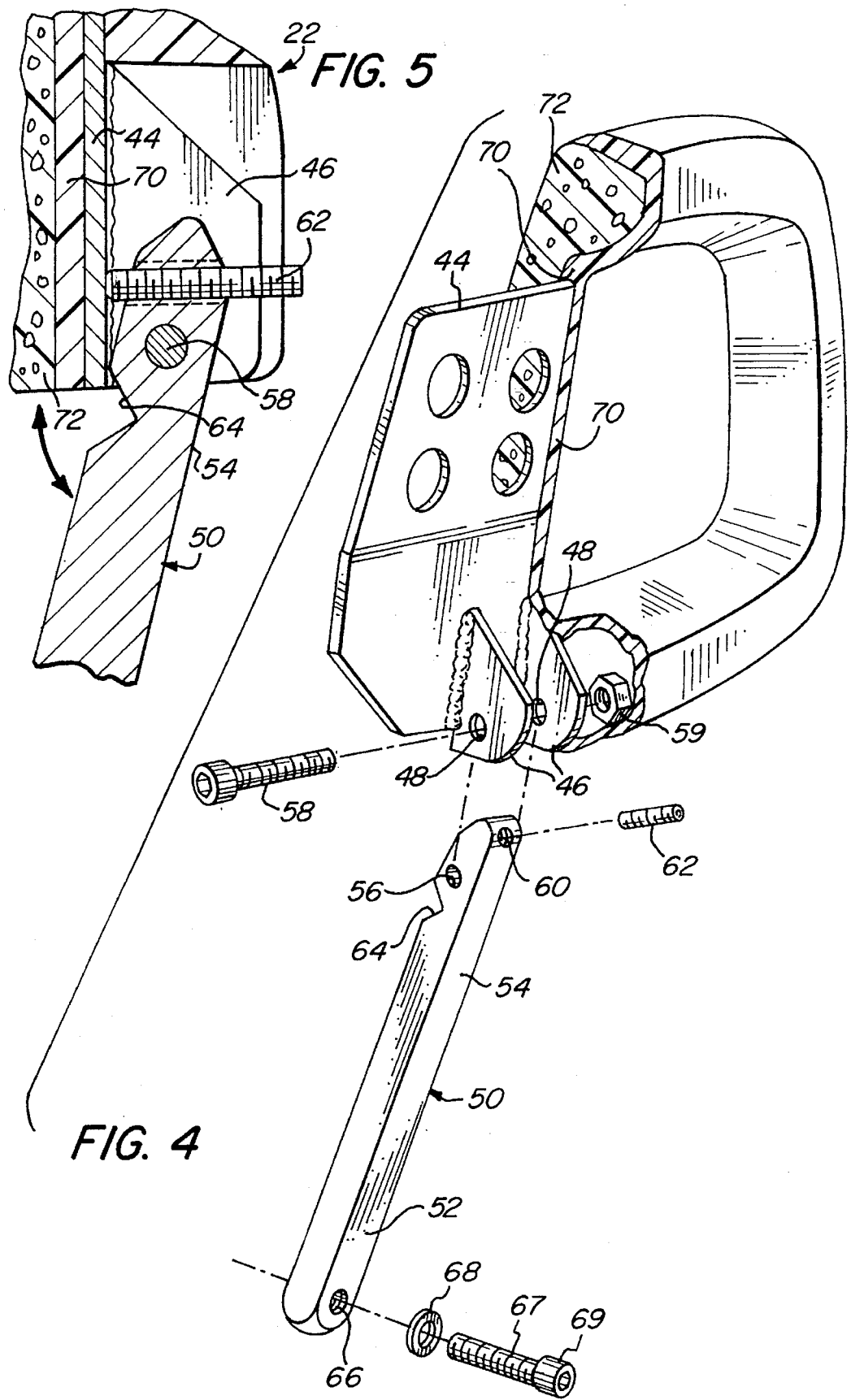

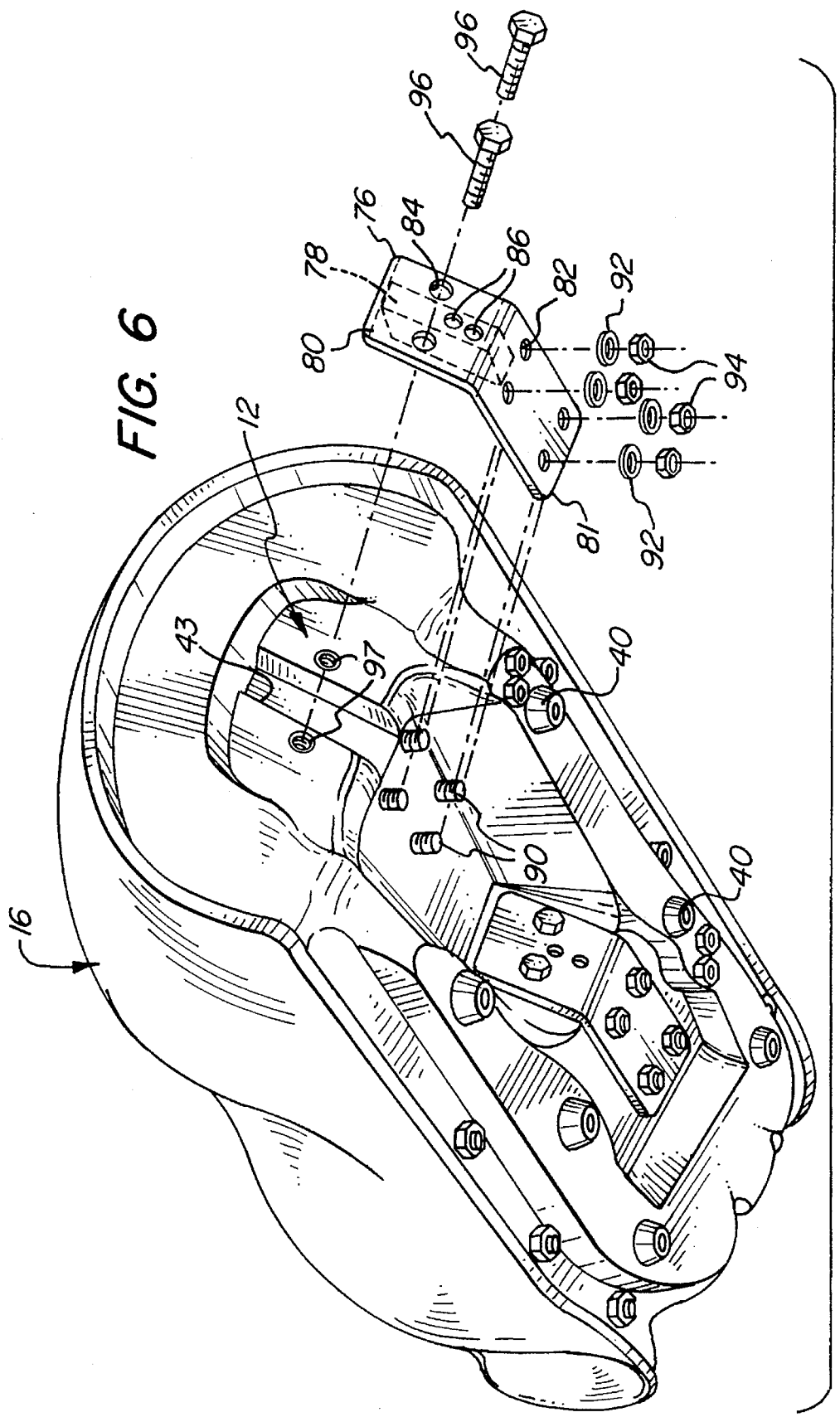

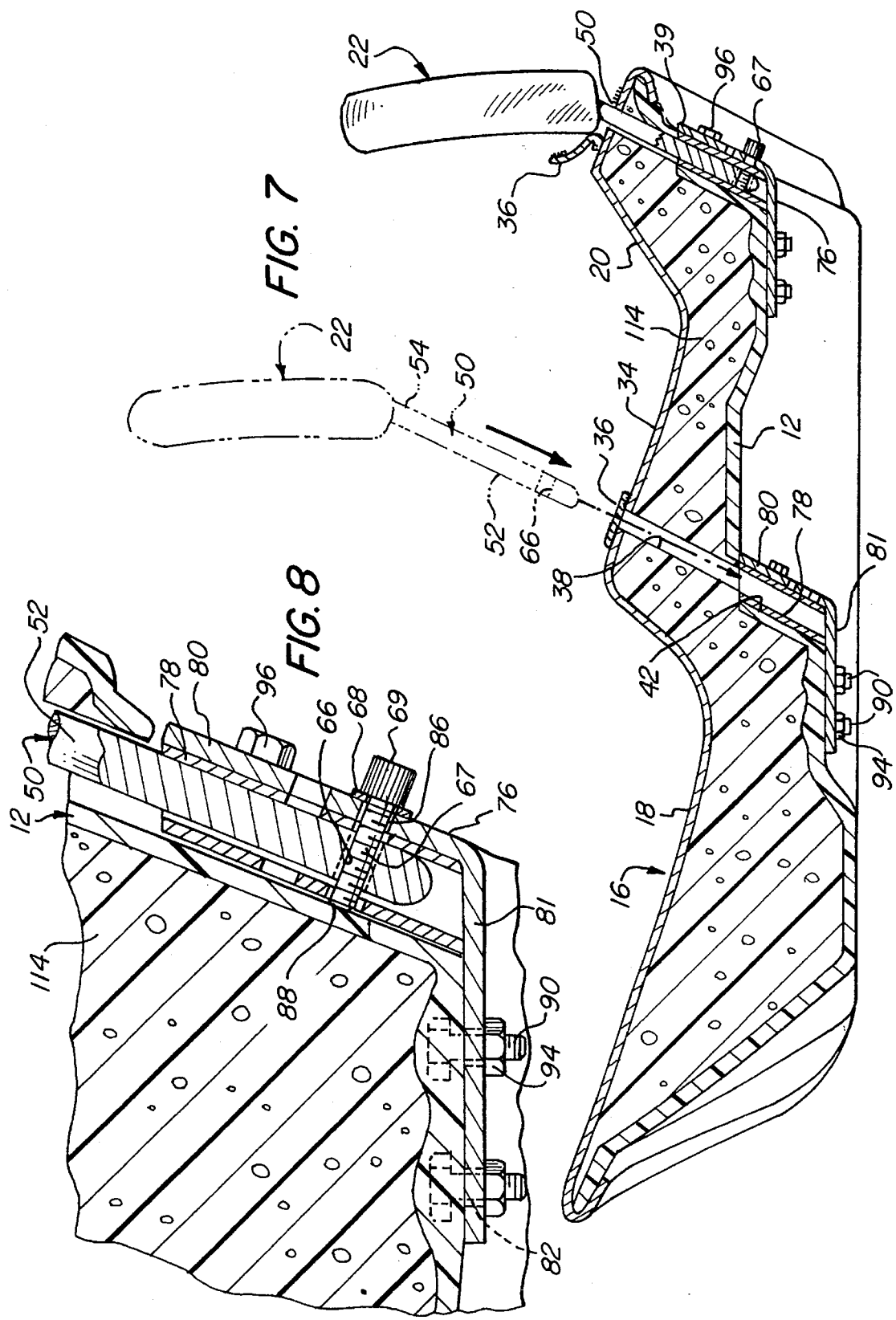

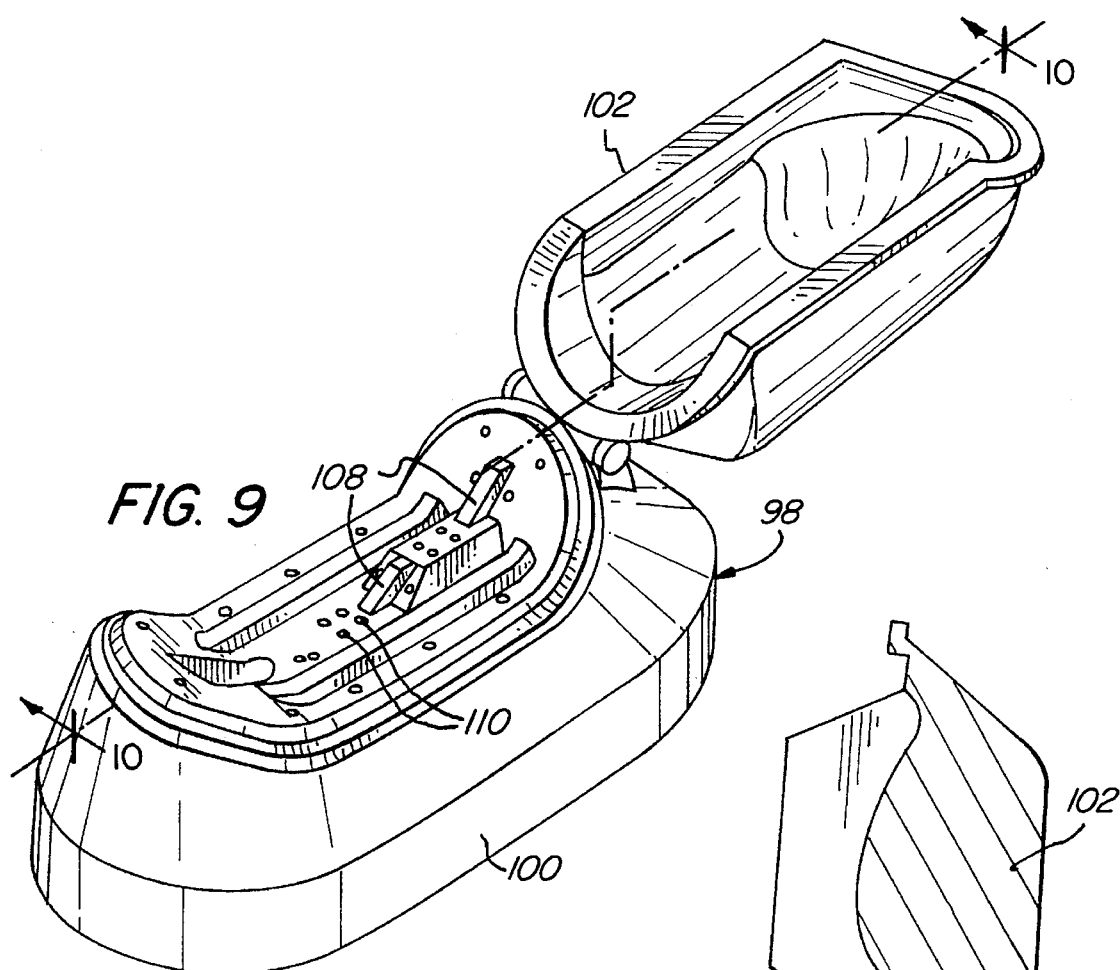
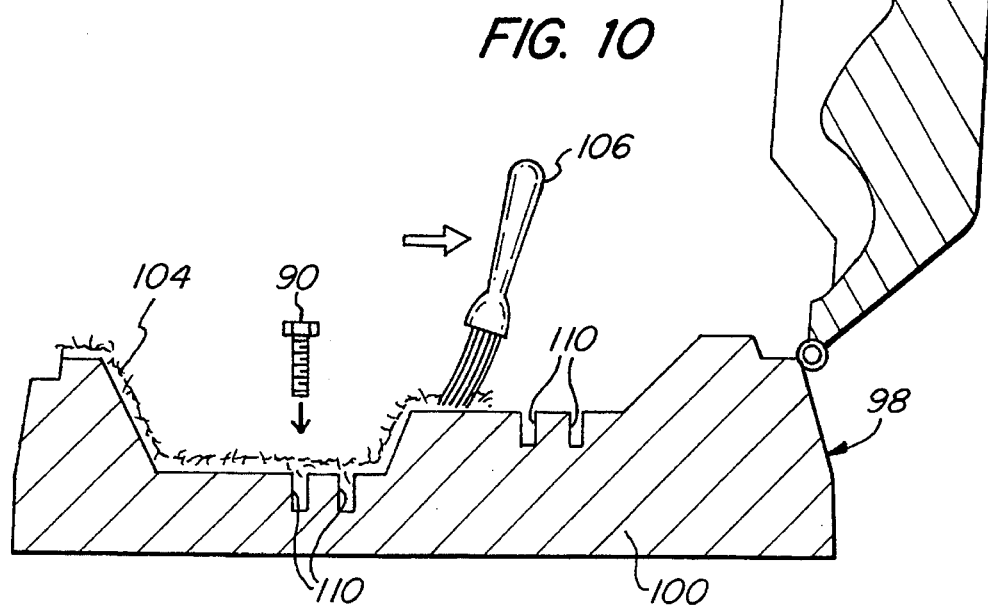

5,608,957

METHOD OF MAKING A MOTORCYCLE SEAT

This is a divisional of application Ser. No. 08/377,650 filed on Jan. 25, 1995, now U.S. Pat. No. 5,544,937.

BACKGROUND OF THE INVENTION

The present invention relates to a tandem motorcycle seat, and, more particularly, to a tandem motorcycle seat which has a backrest which may be selectively positioned to support either driver or passenger, and to a method for molding such motorcycle seats.

Tandem motorcycle seats are frequently used for touring, and comfort is a significant concern. Additionally, it is often viewed as important to maintain an aesthetically pleasing and streamlined look to the motorcycle seat. Often, these objectives may conflict with one another.

Although a tandem motorcycle seat is designed to accommodate a passenger behind the driver, it is frequently occupied by only the driver. Therefore, a backrest for such a seat could be positioned behind the passenger, the driver, or both, or even omitted. If it is removable, safety considerations require that the backrest be securely positioned when mounted.

It is an object of the present invention to provide a novel tandem motorcycle seat which offers flexibility of configuration through selective positioning of a backrest.

It is also an object to provide such a seat that will maintain an aesthetic streamlined appearance when the backrest is not in use.

Another object is to provide such a seat which will safely secure the backrest.

A further object to provide such a seat which is rugged and durable and able to withstand adverse weather and road conditions.

An additional object is to provide a novel method for molding motorcycle seats which effects a strong bond between the cushioning layer and the underlying structural layer of the seat and between the several layers and the hardware.

SUMMARY OF THE INVENTION

It has now been found that the foregoing and related objects may be readily attained in a tandem motorcycle seat for attachment to the frame of a motorcycle and having a unitary rigid, elongated platform member configured to seat upon and be secured to the frame of the motorcycle for firm support thereby. The platform member has front and rear ends and side margins, and it supports an elongated tandem saddle which provides a driver seat portion at its front end and a passenger seat portion at its rear end. Support members on the platform member are positioned adjacent the rear end of each of the seat portions and intermediate the side margins thereof, and each provides an upwardly opening receptacle. The tandem saddle has openings therethrough aligned with the receptacles of the support members. A backrest for a person seated on one of the seat portions has a depending leg spaced inwardly from the side margins thereof and extending through one of said passages in the saddle. The leg has its lower end releasably seated in the receptacle aligned therewith, and the backrest is movable from one seat portion to the other seat portion.

Preferably, the support means includes means releasably locking the lower end of the leg in the receptacle. The receptacle is desirably provided by a tubular member cooperatively dimensioned and configured to seat the lower end of the leg therewithin. The support means also includes a bracket mounted on the platform member and securing the tubular member thereto. Preferably, the bracket is mounted on the lower surface of the platform member and the lower surface of the platform member is configured to seat the brackets.

The means releasably locking the lower end of the leg is typically an elongated member passing through the tubular member and through the lower end of the leg therewithin to releasably lock the lower end of the leg within the tubular member.

The backrest preferably includes a body member pivotally mounted on the leg adjacent the upper end thereof and means for limiting the pivotal movement of the body member in a direction rearwardly of the saddle. The means for limiting the pivotal movement is desirably an elongated member passing through the upper end of the leg above the pivot point and abutting the body member of the backrest.

Desirably, the saddle includes closure elements releasably secured over the passages therein.

In an improved method for making a motorcycle seat, there is provided a mold dimensioned and configured to form a unitary rigid, elongated body configured to seat upon and be secured to the frame of the motorcycle for firm support thereby. The mold has a lower element and an upper element, and a first layer of a mixture of glass fibers and polyester resin is applied to the surface of the lower mold element. Hardware is placed in this first layer, and a second layer of a mixture of glass fibers and polyester resin is applied on the first layer and hardware so as to encapsulate at least a portion of the hardware in the first layer and the second layer. The first layer and the second layer are partially cured, and a foamable synthetic resin is introduced into the lower element of the mold and onto the partially cured second layer and about the hardware. The upper element of the mold is interfitted with the lower element of the mold, and the first and second layers and the foamable synthetic resin form are then fully and concurrently cured in the assembled mold to produce a chemical bond between the second layer and the synthetic resin foam layer to provide the seat body. The upper mold element is removed, and the seat body is removed from the mold and is then covered with an outer layer of flexible material.

Preferably, the lower mold element is formed with small cavities in its upper surface, and some of the hardware is inserted through the first layer into the cavities. Before the covering is applied, the excess form layer is trimmed. The preferred foamable resin is polyurethane.

BRIEF DESCRIPTION OF THE DRAWINGS

FIG. 1 is a fragmentary perspective view of a motorcycle with a tandem seat embodying the present invention;

FIG. 2 is a perspective view drawn to an enlarged scale of a support member used to releasably mount the backrest in the embodiment of FIG. 1;

FIG. 3 is a perspective view of the depending leg of the backrest used in the embodiment of FIG. 1 and drawn to the same scale as FIG. 2;

FIG. 4 is a fragmentary, partially exploded perspective view of the backrest drawn to an enlarged scale, and with portions broken away to reveal internal construction;

FIG. 5 is a fragmentary sectional view of the backrest of the tandem motorcycle seat along the line 5—5 of FIG. 1, and drawn to a further enlarged scale;

FIG. 6 is a partially exploded perspective view of the bottom of the tandem motorcycle seat of FIG. 1, shown without the backrest and drawn to an enlarged scale;

FIG. 7 is a sectional view of the tandem motorcycle seat along the line 7—7 of FIG. 1, showing the backrest in full line in one position, and in phantom line in an alternate portion;

FIG. 8 is an enlarged portion of the structure in FIG. 7;

FIG. 9 is a perspective view of a mold used to form the body portion of the tandem motorcycle seat of the present invention;

FIG. 10 is a sectional view along the line 10—10 of FIG. 9, diagrammatically illustrating hardware being inserted and a brush applying a glass fiber/resin mixture;

DETAILED DESCRIPTION OF THE PREFERRED EMBODIMENTS

Figure 11:
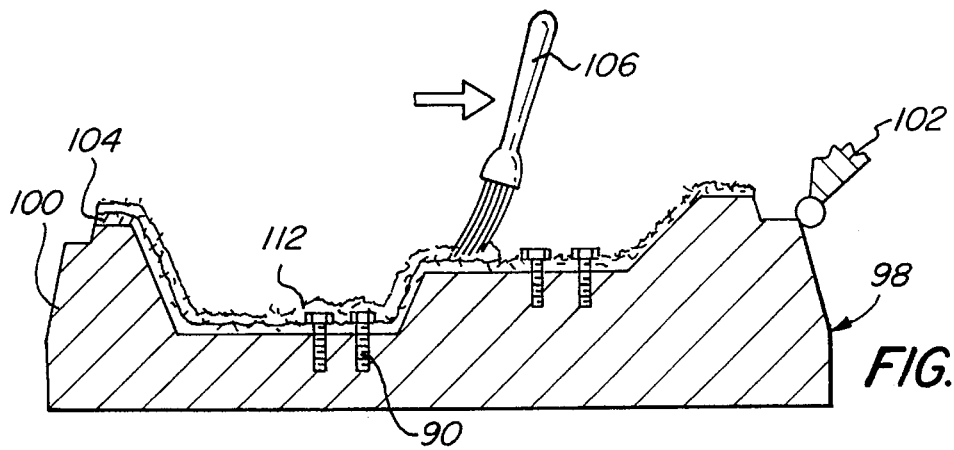
FIGS. 11–13 are schematic illustrations of the several steps in the molding of the seat body.

Turning first to FIG. 1, a motorcycle seat embodying the present invention is generally designated by the numeral 10 and has a platform member or base (as shown in FIG. 6) generally designated by the numeral 12 secured to the frame or chassis 14 of a motorcycle generally designated by the numeral 15. Secured on the top surface of the platform member 12 is a contoured saddle generally designated by the numeral 16 and providing a disposed driver seat portion 18 and a rearwardly disposed passenger seat portion 20. A backrest generally designated by the numeral 22 is shown positioned behind the passenger seat portion 20.

The saddle 16 is upholstered and is configured to have its periphery blend into the adjacent lines of the chassis 14 of the motorcycle 15. As shown, the seat 10 extends forwardly so that its forward end abuts the gasoline tank 24 of the motorcycle 15. As shown, the passenger seat portion 20 is elevated above the driver seat portion 18, and the handhold bar 26 is provided above the rear wheel 27 of the motorcycle 15.

The saddle 16 has side panels 28 on either side thereof which are of a smooth waterproof material such as vinyl or leather. An accent strip or welt 30 extends around the sides of the backrest 22, and it may be the same color as an accent strip or welt 32 around the sides of the saddle 16. The covering 34 for the upper surface of the saddle 16 may be textured or smooth and it may be fabricated of leather, vinyl or other suitable flexible material. Beneath the covering 34 comprising the outer surface of the saddle 16 is a foam layer 114, which is best seen in FIG. 7, and which serves to provide comfort to the rider(s). This foam layer 114 may be flexible cellular foamed synthetic resin or any other resiliently deformable material. On the covering 34, directly behind the driver seat portion 18 and the passenger seat portion 20 are flaps 36 which removably cover passages 38, 39 in through the covering 34 and the foam layer 114 of the saddle 16.

Turning now to FIGS. 6 and 7, the base or platform member 12 is conveniently formed from molded fiberglass reinforced resin, and it is configured to closely fit or wrap about the chassis 14 and components of the particular motorcycle 15 upon which it is to be mounted. The platform member 12 has conventional mounting elements (not shown) on the bottom surface thereof which mate with cooperating retainers (not shown) on the motorcycle chassis 14 to secure it thereto. Desirably, the platform member 12 has resilient spacers 40 spaced thereabout which support the platform member 12 upon the motorcycle frame 14. The platform 12 has a first upwardly extending recess 42 underneath and to the rear of the driver seat portion 18 and a second upwardly extending recess 43 underneath and to the rear of the passenger seat portion 20.

As seen in FIGS. 4 and 5, the backrest 22 has a rigid, generally planar body member 44 which is oriented generally vertically. A pair of parallel, horizontally spaced arms 46 extend rearwardly from the body member 44 at right angles thereto. The arms 46 are spaced inwardly from the side margins of the backrest 22 generally centrally thereof, and have aligned apertures 48 therein.

As seen in FIGS. 3–5, a depending leg 50 of generally rectangular cross section has a lower end portion 52 and an upper end portion 54. The upper end portion 54 of the leg 50 has a bore 56 extending therethrough in alignment with the apertures 48 in the arms 46 between which it is disposed. A pivot bolt 58 passes through the bore 56 and apertures 48 of the arms 46 to pivotally mount the leg 50 to the body member 44 of the backrest 22, and nut 59 retains the bolt 58 in position.

A second bore 60 in the upper end portion 54 of the leg 50 extends fore and aft and threadably seats a screw 62 which is adjustably positioned in the bore 60 with its forward end thereof abutting the body member 44. Movement of the screw 62 within the bore 60 permits adjustable limitation of the pivoting of the body member 44 on the depending arm 50 in a rearward direction.

A notch 64 in the forward surface of the leg 50 receives the lower edge of body member 44 when the upper end of the body member 44 pivots forwardly.

A bore 66 in the lower end portion 52 of the leg 50 receives the locking screw 67 and a washer 68 is positioned between the head 69 of the locking screw 67 and the leg 50.

As best seen in FIG. 4, the body member 44 and the arms 46 are encapsulated between layers 70 of a fiberglass reinforced polyester resin. A foam layer 72 is placed about the front and around the edges of the body member 44 to provide support and comfort for the driver or passenger. A pliable outer layer 74 of leather, vinyl or the like, surrounds the backrest 22 to provide protection from the elements and an aesthetically pleasing appearance. Optionally, a storage pocket 75 may be formed in outer layer 74.

Referring to FIGS. 2 and 6–8, each of the pair of brackets 76 has mounted thereon a tubular member 78 with a generally rectangular cross section. The bracket 76 has a base leg 81 and an upwardly inclined leg 80 against which the tubular member 78 is secured by welding or the like.

The generally horizontal base leg 81 of the bracket 76 is provided with four apertures 82 and the inclined leg 80 of the bracket 76 is provided with a pair of apertures 84 on opposite sides of the tubular member 78 and apertures 86 near its lower end to receive the locking screw 67 which also extends through aligned apertures 88 in the tubular member 78. The locking screw 67 extends through the bore 66 on the leg 50 and thereby releasably locks the lower end portion 52 of the leg 50 in the tubular member 78.

Four studs 90 extend downwardly from the lower surface of the platform member 12 from a portion adjacent to and in front of each of the recesses 42 and 43 and extend through the apertures 82 in the horizontal base leg 81 of the bracket 76. Washers 92 and nuts 94 are used to secure the bracket 76 on the studs 90. Bolts 96 extend through apertures 84 in the upwardly inclined leg 80 of the bracket 76 and into threaded inserts 97 in platform member 12 to complete the fastening the bracket 76 to the underside of platform member 12.

When installing the backrest 22 behind the passenger seat portion 20, the flap 36 in the covering 34 behind the passenger seat portion 20 is lifted to expose the passage 39 in the saddle 16. The leg 50 of the backrest 20 is then slid downwardly through the passage 39 and into the tubular member 78 below the passenger seat portion 20. The locking screw 67 is then pushed through the apertures 86 in the bracket 76, the apertures 88 in the tubular element 78 and the bore 66 in the lower end portion 52 of the leg 50. The motorcycle seat 10 is then mounted on the frame 14 of the motorcycle 15, the backrest 22 is adjusted to the desired angle, and the set screw 62 is used to lock the angle of the backrest 22 relative to the saddle 16.

When it is desired to move the backrest 22 from a position behind the passenger seat portion 20 to a position behind the driver seat portion 18, the motorcycle seat 10 is unbolted from the frame 14 of the motorcycle 15. The locking screw 67 is then removed from the apertures 86, 88 and the bore 66, and the lower end portion 52 of the leg 50 is withdrawn from the tubular member 78 and the passage 39 in the saddle 16. The closure flap 36 in the covering 34 behind the passenger seat portion 20 may then be reseated to restore a streamlined appearance to the saddle 16. The closure flap 36 in the covering 34 behind the driver seat portion 18 is lifted to expose the passage 38 behind the driver seat portion 18. The lower end portion 52 of the leg 50 can then be inserted downwardly through the passage 38 and into the tubular member 78 carried by the bracket 76 mounted below the driver seat portion 18. The locking screw 67 is then installed as described above, the motorcycle seat 10 is again mounted on the frame 14 of the motorcycle 15, and the screw 62 used to adjust the angle of the backrest 22 relative to the saddle 16.

In fabricating and assembling the motorcycle seat 10, a mold 98 having both a lower element 100 and an upper element 102, as shown in FIG. 9, is employed. The mold 98 is dimensioned and configured to form the unitary, rigid, elongated platform member 12 and the foam cushion layer 114.

Referring first to FIG. 10, a first layer 104 of a mixture of glass fibers and polyester resin is applied to the upper surface of the lower element 100 of the mold 98, typically by means of a brush 106. As can be seen in FIG. 9, there are raised portions 108 in the lower element 100 of the mold 98 which serve to form the recesses 42, 43 in the platform to receive the tubular members 78.

Before or after application of the first layer 104, various hardware such as the studs 90 are inserted through the first layer 104 and into cavities 110 in the lower element 100 of the mold 98.

As seen in FIG. 11, a second layer 112 of the mixture of glass fibers and polyester resin is then applied on top of the first layer 104 and the various hardware so as to encapsulate at least a portion of the hardware in the first layer 104 and the second layer 112. Preferably, fasteners such as bolts and studs with polygonal or elongated heads (not shown) may be used to limit unwanted rotation. Application of the second layer 112 is again typically by means of the brush 106. Subsequent to application of the second layer 112, both the first layer 104 and the second layer 112 are partially cured.

Figure 12:
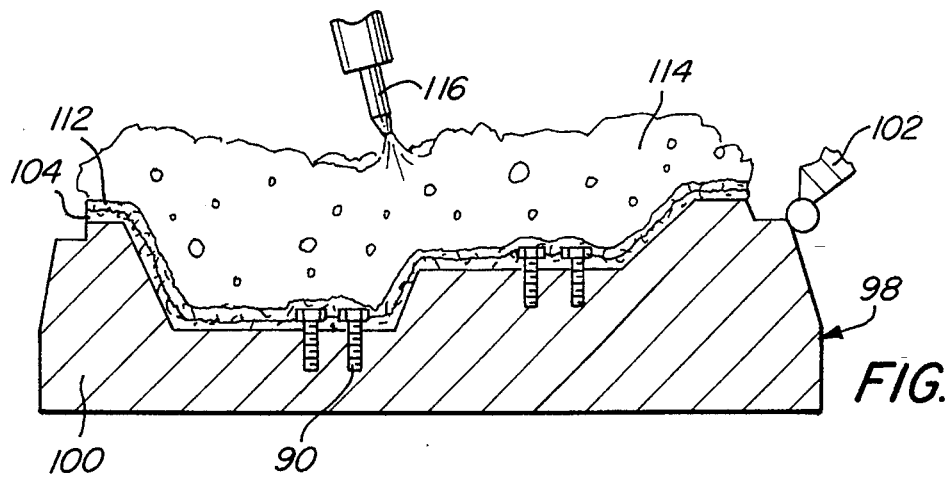
Figure 13:
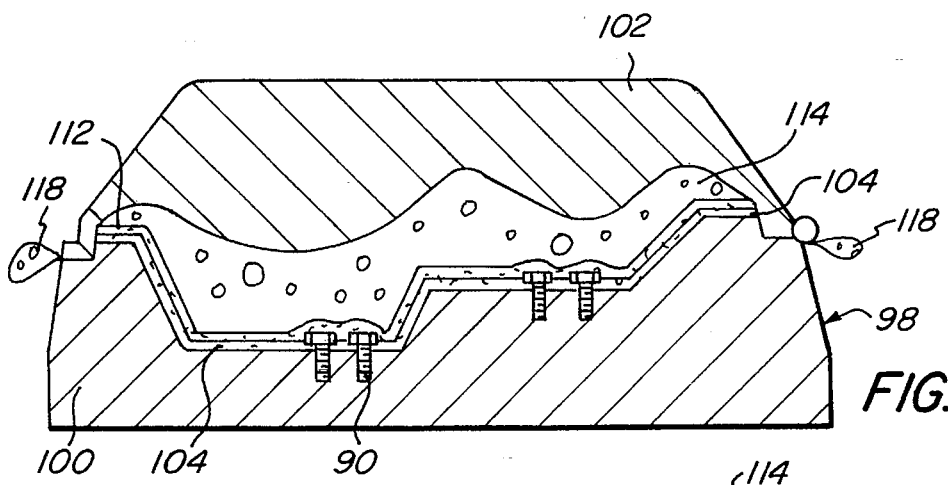

Referring to FIG. 12, a foamable synthetic resin 114 is introduced into the mold onto the partially cured second layer 112. The foam 114 is typically introduced through a nozzle 116. Subsequently, the upper element 102 of the mold 98 is locked with the lower element 100. The contents of the mold 98 are subjected to heat and pressure to fully and concurrently cure the resins in the several layers and produce both a chemical bond and a mechanical interlocking between the second layer 112 and the synthetic resin foam layer 114 to produce the seat body.

Figure 14:
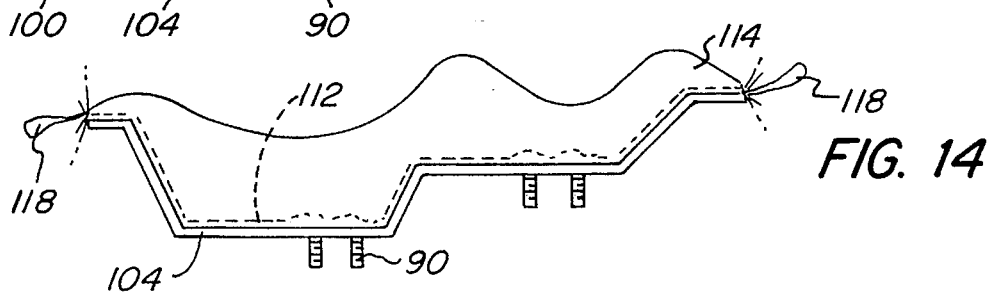
FIG. 14 is the seat body after removal from the mold.

As shown in FIG. 14, when the fully cured seat body is removed from the mold, there is some excess foam 118 which will typically be trimmed. At this point, a flexible outer layer or cover which includes the previously mentioned side panels 28 and covering for the upper surface 35 shown in FIG. 1 is installed.

The backrest is fabricated and assembled in a similar manner as the platform member 12 and saddle 16.

Thus, it can be seen from the foregoing detailed specification and attached drawings that the tandem motorcycle seat of the present invention provides a flexible configuration through a backrest which may be selectively positioned behind the driver, the passenger, or both, and may even be completely removed. Use of a closure flap over the receiving passages for the backrest permits the seat to maintain an aesthetically pleasing appearance when the backrest is not in use. Additionally, the use of a locking screw for the backrest when it is in either position assures safety for the rider and the passenger. The backrest is of rugged construction and able to tolerate adverse weather and road conditions.

Having thus described the invention, what is claimed is:

1. In a method for making a motorcycle seat for attachment to the frame of an associated motorcycle, the steps comprising:

(a) providing a mold dimensioned and configured to form a unitary, rigid, elongated platform member configured to seat upon and be secured to the frame of the associated motorcycle for firm support thereby, said mold having a lower element and an upper element;

(b) applying a first layer of a mixture of glass fibers and polyester resin onto the surface of said lower element of said mold;

(c) embedding hardware in said first layer;

(d) applying a second layer of a mixture of glass fibers and polyester resin on said first layer and about said hardware so as to encapsulate at least a portion of said hardware in said first layer and said second layer;

(e) partially curing said first layer and said second layer;

(f) introducing a foamable synthetic resin into said lower element of said mold on said partially cured second layer and about said hardware;

(g) interfitting said upper element of said mold on said lower element of said mold;

(h) curing said first and second layers and said foamable synthetic resin in said assembled mold to produce a cellular cushioning layer from said foamable synthetic resin and to produce a chemical bond between said second layer and said cellular cushioning layer to provide a seat body;

(i) removing said upper mold element; and (j) removing said seat body from said lower mold element.

2. The method for making a motorcycle seat in accordance with claim 1 including the step of applying a cover of flexible material about said cushioning layer of said seat body.

3. The method for making the tandem motorcycle seat in accordance with claim 1 including the step of trimming excess fully cured foam cushioning layer prior to the covering step.

4. The method for making the tandem motorcycle seat in accordance with claim 1 wherein said mold providing step includes providing a lower mold element with hardware receiving cavities therein and said hardware placing step involves inserting some of said hardware through said first layer and into cavities in said lower mold element.

5. The method for making the tandem motorcycle seat in accordance with claim 1 wherein said foamable synthetic resin is a foamable polyurethane composition.

* * * * *